United States Patent [19] [11] 3,870,483
Ritzler [45] Mar. 11, 1975

[54] SEPARATING ARRANGEMENT
[75] Inventor: Bo Ritzler, Sodertalje, Sweden
[73] Assignee: AB Filtrator, Sodertalje, Sweden
[22] Filed: Aug. 22, 1973
[21] Appl. No.: 390,610

[30] Foreign Application Priority Data
Aug. 23, 1972 Sweden.............................. 10957/72

[52] U.S. Cl.......................... 55/192, 32/33, 55/462, 128/276
[51] Int. Cl............................................ A61c 17/04
[58] Field of Search........ 32/33; 55/43, 45, 55, 171, 55/176, 192, 462, 421; 128/276, 277

[56] References Cited
UNITED STATES PATENTS
3,457,645  7/1969  Swanson................................. 32/33
3,745,033  7/1973  Keiper................................. 32/33 X
FOREIGN PATENTS OR APPLICATIONS
1,220,255  1/1971  Great Britain...................... 32/33 X Primary Examiner—Samih N. Zaharna
Assistant Examiner—Richard W. Burks
Attorney, Agent, or Firm—Hofgren, Wegner, Allen, Stellman & McCord

[57] ABSTRACT

An arrangement for separating a fluid comprising at least one liquid component and solid material particles. The fluid may also comprise gaseous components. The arrangement includes two adjacent liquids, between which a boundary surface is formed. By means of capillary force the boundary surface is non-horizontal. During separation the fluid comprising the solid material particles is transported by influence of the gravity force towards the non-horizontal boundary surface, through which heavier solid material particles penetrate down into a collecting pocket provided below that surface. The lighter solid material particles and the liquid component or components of the fluid do not penetrate through the non-horizontal boundary surface, but slide along said surface past the bottom terminating edge thereof.

20 Claims, 4 Drawing Figures

SEPARATING ARRANGEMENT

This invention relates to an arrangement for separating a fluid comprising one or more fluid components, which fluid includes solid material particles. Such separation is often desirable, e.g. when it is desirable to separate solid material particles from a fluid in order to recover valuable substances from said particles, or in order to prevent discharge of environmentally harmful substances contained in said particles. At such a separation it may also be desirable to eliminate gaseous components included in said fluid.

The prior art arrangements for separating solid material particles from a fluid generally utilize sedimentation, which also is true for the arrangement of the present invention, according to which there is provided an improved and simplified separating arrangement having high efficiency also when small, which implies that it is possible to utilize the present separating arrangement even where separation is impracticable by prior art means.

The invention is defined in the appended claims and described below with reference to the drawings, in which:

FIG. 1 schematically shows, partly in cross-section, an embodiment of the present invention;

Figure 1:
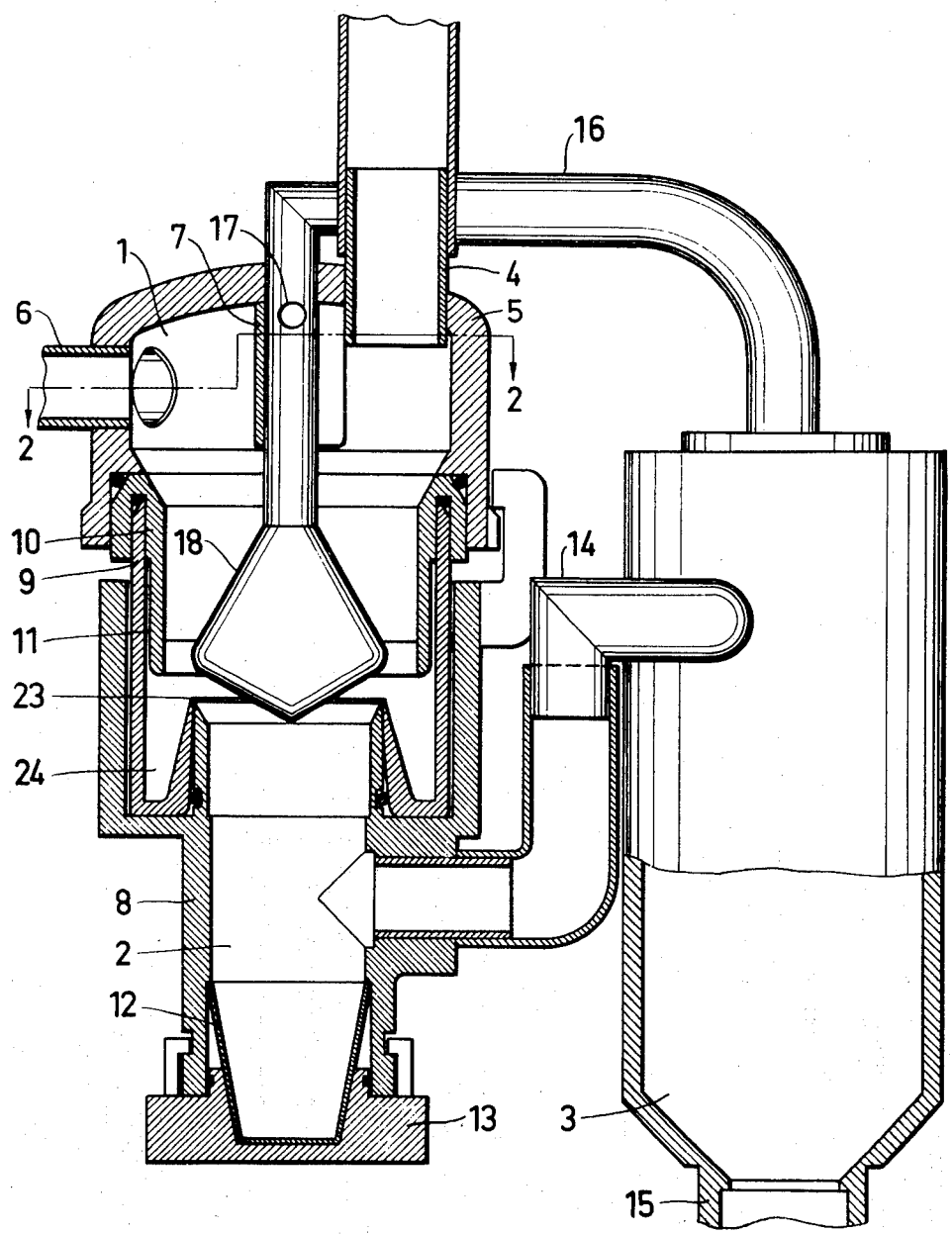
Figure 2:
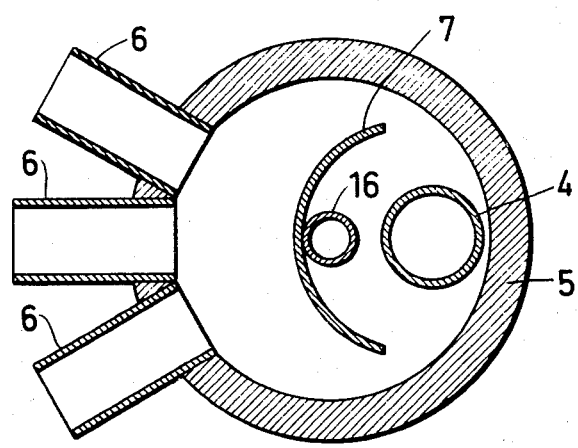
FIG. 2 is a cross-section along the line 2—2 in FIG. 1.

The embodiment shown in the drawings is a separator intended to be utilized at dental treatments for the separation of air, cooling fluid, saliva and solid material particles, such as amalgam having been drilled loose. The arrangement comprises a separating unit 1, a collecting unit 2 and a pressure equalizing unit 3. The separating unit 1 is connected to a source of subatmospheric pressure (not shown) by means of a tube 4, the orifice of which being situated in the top part of a top vessel 5. The top vessel 5 is also provided with one or more inlet tubes 6 (only one shown), through which saliva, cooling fluid etc is transported by suction action into the vessel 5, and between the inlet tube 6 and the tube 4 there is provided a shield means 7. The top vessel 5 is in an air-tight manner connected to a bottom vessel 8 by means of an annular collecting means 9 and an intermediate body 10. Between the outer wall of the lower part of the intermediate body and the side wall of the annular collecting means 9 there is a capillary slot 11. A collecting pot 12 is provided in the lower part of the bottom vessel 8, the bottom piece 13 of which being removable.

The bottom vessel 8 is connected to the pressure equalizing unit 3 by means of an overflow outlet 14. The pressure equalizing unit 3 is provided with an outlet 15 and connected to the separating unit 1 by means of a pressure equalizing tube 16, which enters in the central part of the top vessel 5 behind the semicylindrical shield means 7, where the tube 16 is provided with openings 17. The tube 16 is elongated downwards into the separating unit 1, and in the lower end of the tube 17 there is mounted a guide means 18 having a twinconical shape.

Figure 3:
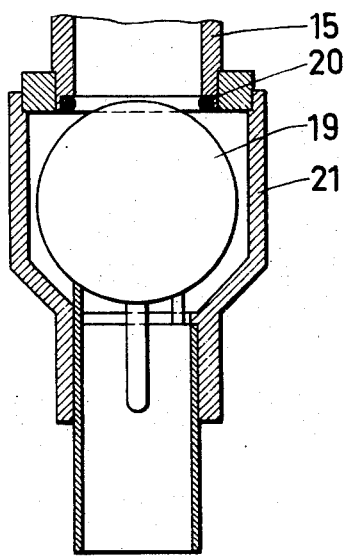
FIG. 3 shows a non-return valve connectable to the arrangement of FIG. 1.

The outlet 15 of the pressure equalizing unit is provided with a non-return valve including an essentially spherical body 19 and a sealing ring 20 contained in a non-return valve housing 21, c.f. FIG. 3.

Preparation for use of the separating arrangement is done in the following manner.

Figure 4:
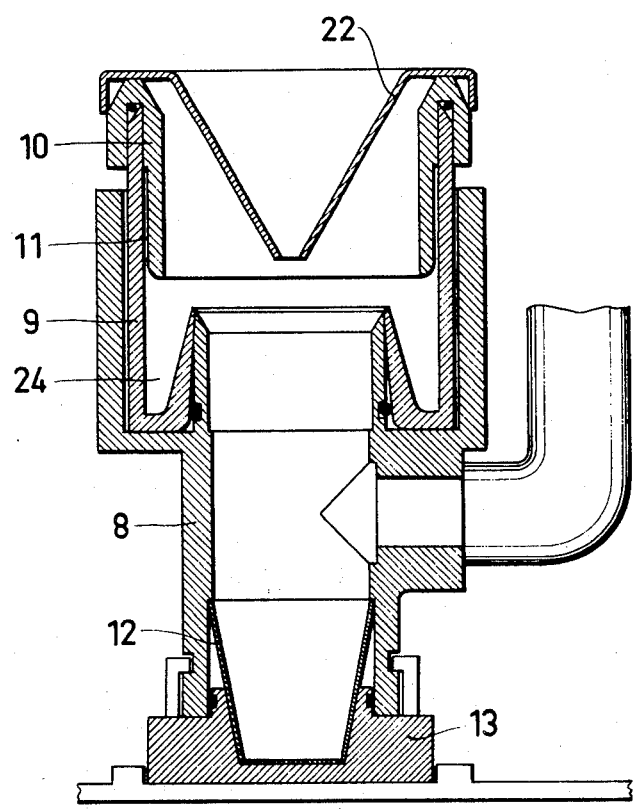
FIG. 4 shows a part of the arrangement of FIG. 1 during preparation for use.

Subsequent to the required cleaning of the parts of the arrangement the collecting pot 12 is put in its proper position in the bottom vessel 8, and the bottom piece 13 thereof is secured. The annular collecting means 9 is mounted in the top part of the bottom vessel 8, whereafter the bottom vessel 8 is filled with water up to the overflow outlet 14. After that, the intermediate body 10 is put into proper position. Now, a layer of oil is to be applied on top of the water. This is done by means of a funnel 22, through which a predetermined amount of oil is poured, c.f. FIG. 4. After that, the funnel 22 is removed. Then, the other parts of the arrangements are mounted, and it is now ready for use, as shown in FIG. 1.

The amount of oil is prechosen in such manner, that the lower surface level of the oil is in the bottom vessel 8 below the top inner edge 23 of the annular collecting means 9, and the upper surface level of the oil is at the intermediate body 10 a substantial distance above the lower edge thereof. The lower pocket 24 of the annular collecting means 9 is filled with water, which by capillary force also remains in the capillary slot 11. Thereby, the boundary surface between water and oil will extend from the edge 24 up towards the lower orifice of the capillary slot 11. Thus, this boundary surface is not horizontal but sloping inwards/downwards.

In use saliva, air, cooling fluid and solid particles are transported by suction action from the mouth cavity of the patient through a flexible tube (not shown) into the inlet tube 6 to the separating unit 1. The fluid stream hits the shield means 7, past which only gaseous components (air) can pass out through the tube 4. Cooling water, saliva and solid particles fall downwards through the oil between the guide means 18 and the intermediate body 10 against the inwards/downwards sloping boundary surface between oil and water above the pocket 24. Heavier particles will penetrate through this boundary surface and collect into the pocket 24, whereas lighter particles, water and saliva will slide along the boundary surface down into the bottom vessel 8, where lighter particles are collected in the collecting pot 12, whereas water and saliva continuously discharge through the overflow outlet 14 into the pressure equalizing unit 3.

It is essential that the top surface of the oil in the separating unit 1 is as little as possible disturbed by the forming of waves, and that the level thereof does not vary too much. Thus, the guide means 18 is immersed in the oil in order to reduce the forming of waves. Further, the pressure in the separating unit 1 and the pressure equalizing unit 3 is kept at the same level by means of the pressure equalizing tube 16. In order to eliminate the influence of pressure variations in the drain pipe system, the outlet tube 15 is provided with said non-return valve, the spherical body 19 of which is sealing against the sealing ring 20 due to the subatmospheric pressure which is maintained in the separating unit 1 as well as in the pressure equalizing unit 3, when the arrangement is in use. When the arrangement is switched off, this subatmospheric pressure disappears, whereby the non-return valve opens and lets out the fluid which has been collected in the pressure equalizing unit 3.

Further, the non-return valve secures that no fluid is sucked the back way in through the outlet 15.

The sealing between the various parts of the arrangement is of great importance in order to obtain good operational results. In particularly important places there are provided sealing O-rings, e.g. between the bottom vessel 8 and the annular collecting means 9, as is indicated in FIG. 1.

The separating arrangement disclosed is easy to operate, easy to clean and hygenic. The particles to be collected for recovery (gold, amalgam etc) are collected in the pocket 24 of the removable annular collecting means 9, whereas other particles are collected in the collecting pot 12, which suitably is a throw-away pot.

The example described above relates to one embodiment of the invention only. Other embodiments are possible within the scope of the invention, which is defined in the claims.

What I claim is:

1. Arrangement for separating into components a fluid comprising at least one component and solid material particles, characterized in that an upper and a lower means of essentially cylindrical shape enclose one upper and one lower part, respectively, of a first liquid, whereby the cavity defined by the lower cylindrical means has a smaller radius than that of the upper one; that an annular pocket is provided around the lower cylindrical means and below the upper one, the upper end of said pocket being terminated by a capillary slot arranged around the upper cylindrical means; that the pocket contains a second liquid having higher specific gravity than that of the first liquid, a boundary surface formed between said first and second liquids having essentially the shape of a frustrum of a funnel between the lower edge of the upper cylindrical means and the upper edge of the lower cylindrical means due to the capillary influence which the capillary slot has on the second liquid, said capillary slot being arranged around the upper cylindrical means whereby, at separation, said particles together with the liquid form components of said fluid are forced by influence of the gravity to move downwards through said first liquid towards the funnel-shaped boundary surface between said first and said second liquids, whereby heavier particles will penetrate the boundary surface and collect in said pocket, whereas lighter particles together with the liquid form components of the fluid will slide along the funnel-shaped boundary surface and down into the lower cylindrically shaped part of said first liquid.

2. Arrangement according to claim 1, characterized in that said second liquid is water.

3. Arrangement according to claim 2, characterized in that a collecting pot is arranged in the lower part of the lower cylindrical means, the side wall of which being provided with an opening to an overflow outlet; and that said first liquid in said lower cylindrical means downwards is bounded by water, whereby the boundary surface between water and said first liquid is at a level between said opening to said overflow outlet and the upper edge of of said lower cylindrical means.

4. Arrangement according to claim 3, characterized in that an inlet cavity arranged above the upper cylindrical means is provided with at least one inlet for the fluid comprising the particles to be separated and further provided with exhaust means for gaseous components of said fluid; and that a bent shield means having one convex and one concave main surface is arranged in said cavity between said exhaust and said inlet, said convex main surface facing said inlet.

5. Arrangement according to claim 4, characterized in that said overflow outlet is connected to a pressure equalizing vessel being connected to said inlet cavity by means of a pressure equalizing tube, which opens up in the upper part of the inlet cavity at the concave main surface of the shield means.

6. Arrangement according to claim 5, characterized in that the pressure equalizing vessel has an outlet in its lower part, said outlet being provided with a non-return valve.

7. Arrangement according to claim 6, characterized in that an essentially twin-cone shaped means is concentrically arranged in the upper cylindrical means and essentially above the lower cylindrical means, whereby at least the lower cone is situated in said first liquid.

8. Arrangement according to claim 1, characterized in that an inlet cavity arranged above the upper cylindrical means is provided with at least one inlet for the fluid comprising the particles to be separated and further provided with exhaust means for gaseous components of said fluid; and that a bent shield means having one convex and one concave main surface is arranged in said cavity between said exhaust and said inlet, said convex main surface facing said inlet.

9. Arrangement according to claim 2, characterized in that an inlet cavity arranged above the upper cylindrical means is provided with at least one inlet for the fluid comprising the particles to be separated and further provided with exhaust means for gaseous components of said fluid; and that a bent shield means having one convex and one concave main surface is arranged in said cavity between said exhaust and said inlet, said convex main surface facing said inlet.

10. Arrangement according to claim 3, characterized in that said overflow outlet is connected to a pressure equalizing vessel being connected to said inlet cavity by means of a pressure equalizing tube, which opens up in the upper part of the inlet cavity at the concave main surface of the shield means.

11. Arrangement according to claim 10, characterized in that the pressure equalizing vessel has an outlet in its lower part, said outlet being provided with a non-return valve.

12. Arrangement according to claim 1, characterized in that an essentially twin-cone shaped means is concentrically arranged in the upper cylindrical means and essentially above the lower cylindrical means, whereby at least the lower cone is situated in said first liquid.

13. Arrangement according to claim 2, characterized in that an essentially twin-cone shaped means is concentrically arranged in the upper cylindrical means and essentially above the lower cylindrical means, whereby at least the lower cone is situated in said first liquid.

14. Arrangement according to claim 3, characterized in that an essentially twin-cone shaped means is concentrically arranged in the upper cylindrical means and essentially above the lower cylindrical means, whereby at least the lower cone is situated in said first liquid.

15. Arrangement according to claim 4, characterized in that an essentially twin-cone shaped means is concentrically arranged in the upper cylindrical means and essentially above the lower cylindrical means, whereby at least the lower cone is situated in said first liquid.

16. Arrangement according to claim 5, characterized in that an essentially twin-cone shaped means is concentrically arranged in the upper cylindrical means and essentially above the lower cylindrical means, whereby at least the lower cone is situated in said first liquid.

17. Arrangement according to claim 8, characterized in that an essentially twin-cone shaped means is concentrically arranged in the upper cylindrical means and essentially above the lower cylindrical means, whereby at least the lower cone is situated in said first liquid.

18. Arrangement according to claim 9, characterized in that an essentially twin-cone shaped means is concentrically arranged in the upper cylindrical means and essentially above the lower cylindrical means, whereby at least the lower cone is situated in said first liquid.

19. Arrangement according to claim 10, characterized in that an essentially twin-cone shaped means is concentrically arranged in the upper cylindrical means and essentially above the lower cylindrical means, whereby at least the lower cone is situated in said first liquid.

20. Arrangement according to claim 11, characterized in that an essentially twin-cone shaped means is concentrically arranged in the upper cylindrical means and essentially above the lower cylindrical means, whereby at least the lower cone is situated in said first liquid.

* * * * *